US008520233B2

(12) United States Patent
Matsunaga et al.

(10) Patent No.: US 8,520,233 B2

(45) Date of Patent: Aug. 27, 2013

(54) VERIFICATION SYSTEM FOR VARIABLE PRINTING PRODUCTS

(75) Inventors: Sabrina Pui-Wah Matsunaga, Oak Park, CA (US); Francisco M. Valeriano, Torrance, CA (US); Amos Y. Kuo, Torrance, CA (US)

(73) Assignee: Xerox Corporation, Norwalk, CT (US)

( * ) Notice: Subject to any disclaimer, the term of this patent is extended or adjusted under 35 U.S.C. 154(b) by 1654 days.

(21) Appl. No.: 11/494,855

(22) Filed: Jul. 28, 2006

(65) Prior Publication Data

US 2008/0030746 A1 Feb. 7, 2008

(51) Int. Cl.
*G06F 3/12* (2006.01)
*G06K 9/00* (2006.01)

(52) U.S. Cl.
USPC .......................................... 358/1.15; 382/101

(58) Field of Classification Search
USPC ............... 358/1.13, 1.15, 1.16; 700/220, 213
See application file for complete search history.

(56) References Cited

U.S. PATENT DOCUMENTS 4,527,468 A 7/1985 Piotroski ........................... 101/2
4,800,505 A 1/1989 Axelrod et al. ............... 364/478
4,972,655 A 11/1990 Ogawa ............................ 53/155
5,680,742 A 10/1997 Hidding .......................... 53/411
5,915,089 A 6/1999 Stevens et al. ........... 395/200.32
6,467,687 B1 10/2002 Hill et al. ....................... 235/448
6,532,351 B2 3/2003 Richards et al. .............. 399/111
6,711,462 B2 * 3/2004 Flores et al. .................. 700/223
2004/0125406 A1 * 7/2004 McManus et al. ........... 358/1.18
2004/0196485 A1 * 10/2004 Hikichi et al. ............... 358/1.13
2005/0178843 A1 * 8/2005 Frohlich et al. ............... 235/487
2005/0274791 A1 12/2005 Ikeda et al. ................... 235/375
2007/0078559 A1 * 4/2007 Rosen ........................... 700/220
2008/0296312 A1 * 12/2008 Gibb et al. ...................... 221/33

FOREIGN PATENT DOCUMENTS

JP 2004-246411 9/2004
JP 2006-190155 7/2006

* cited by examiner

*Primary Examiner* — Benny Q Tieu
*Assistant Examiner* — Sunil Chacko
(74) *Attorney, Agent, or Firm* — Alix, Yale & Ristas, LLP

(57) ABSTRACT

A verification system includes at least one printing device utilizing paper having an electronic data storage device attached thereto. Each electronic data storage device has identification information stored therein. A quality control reader device senses the identification information stored in the electronic data storage devices. The identification information of each printed page is associated with the print job. After all of the printed pages of the print job are assembled, the identification information of the assembled printed pages is read and compared to the identification information of the pages associated with the print job to determine if the print job is complete and correct.

17 Claims, 6 Drawing Sheets

50

55 66 72

| JOB ID | PAGE COUNT | PAGE 1 ID | PAGE 2 ID | PAGE 3 ID | PAGE 4 ID | PAGE 5 ID | PAGE 6 ID | PAGE 7 ID |
|---|---|---|---|---|---|---|---|---|
| JOB-01 40 | 5 42 | XXXX1 44 | XXXX2 44 | XXXX3 44 | XXXX4 44 | XXXX5 44 | | |
| | | | | | | | | |
| | | | | | | | | |
| | | | | | | | | |

38

FIG. 6

VERIFICATION SYSTEM FOR VARIABLE PRINTING PRODUCTS

BACKGROUND

This disclosure relates generally to systems for the preparation of printed items. More particularly, the present disclosure relates to systems for print products, where the preparation for each print product varies in accordance with selected values of pre-determined parameters.

Many print jobs prepared by modern print shops must be printed as multiple print runs due to differing specifications for each of the print runs. For example, the print job may require the use of different paper stocks for the different print run, or that portions of the print job be printed in black and white while other portions of the print job be printed in color. Completion of the print job therefore requires that the printed pages from the several print runs must be separated from printed pages for other print runs, matching those printed pages to the print job, collating the printed pages and packaging the print job for delivery to the customer.

The tasks recited above may each include a number of sub-tasks. For example, each print run requires supplying a set of printing instructions intended for printing a particular portion of the print job document to the printer device and then printing the document portion in accordance with the supplied sets of printing instructions. A number of mutually different processing instructions may be supplied to a station of an apparatus for assembling print jobs, which processing instructions are each associated with particular sets of the sets of printing instructions.

In one conventional method, documents are printed and further processed in accordance with specific processing instructions associated with those printed documents, without the necessity of providing the documents with special indicia for controlling the further processing of those documents.

Because the printed documents are not scanned in order to read the associated processing instructions, however, the possibility exists that due to errors in the printing of the documents or in the transport of printed documents from the printer to the station, instead of an intended document, another document, which has been printed before or after the intended document and differs therefrom, is processed in accordance with the processing instructions associated with the intended document or in combination with other documents associated with the intended document. Such errors can occur, for instance, in that a document jams or in that a double sheet is supplied to the printer.

As a result of such errors, it is possible, for instance, that a set of personalized documents lacks a last document, which is then included in the next set, intended for a different addressee. It is also possible, for instance, that a bank statement is added to a letter which is addressed to a person other than the person to whose bank account the statement relates. It will be clear that these are extremely undesired consequences. In this connection, it is particularly disadvantageous that an error may have an effect on the assembly of subsequent postal items without this being noticed In another conventional method, documents are provided with special marks that represent codes associated with processing instructions that are stored in a memory. Each time a document is supplied to the assembling apparatus, the special marks of that document are read. In response to the code represented by the special mark as read the processing instructions corresponding with that code are read from the memory and the document is processed accordingly.

Although the special marks are relatively small in comparison with special marks directly representing processing instructions, it is necessary, in determining the lay-out of the documents, to leave some space clear for the special marks, which requires additional coordination. A so-called bled-off printing is often impossible. Further such special marks disturb the appearance of documents and give the document an impersonal character.

SUMMARY

There is provided a verification system for printed products comprising at least one printing device including at least one paper source supplying paper having an electronic data storage device attached to each piece of paper. Each electronic data storage device has identification information stored therein. The system also comprises a quality control reader device adapted to sense the identification information stored in the electronic data storage devices of a completed print job.

The printing device also includes a reader device adapted to sense the identification information stored in the electronic data storage devices.

The verification system further comprises a computer in communication with the printing device, the printing device reader device, the inserter system, and the quality control reader device.

The verification system further comprises an inserter system receiving pages output from the printing device, a sorting device in communication with the computer, and a transport device for conveying pages output by the inserter system to the sorting device. The quality control reader device is disposed proximate to the transport device.

The verification system further comprises a holding area to receive output comprising incomplete or mixed print jobs from the sorting device and a system output area adapted to receive output comprising complete and correct print jobs from the sorting device.

The inserter system may include a reader device in communication with the computer, to sense the identification information stored in the electronic data storage devices.

The computer comprises a database including a page count of the number of pages of each print job received by the at least one printing device and the identification information of each piece of paper utilized by the at least one printing device to print each print job. The computer also comprises a verification operating system to control the printing device, the inserter system, the sorting device and the transport device.

There is also provided a method of controlling the quality of print jobs comprising multiple pages. The method comprises printing each page of the print job with a printing device, associating identification information stored within an electronic data storage device attached to each printed page with the print job, assembling all of the printed pages of the print job, reading identification information stored within the electronic data storage device attached to each of the assembled printed pages, and comparing the identification information of the assembled printed pages to the identification information of the printed pages associated with the print job to determine if the print job is complete and correct.

The method further comprises creating a record in a database stored in a computer for each print job. Associating identification information comprises reading identification information stored within the electronic data storage device attached to each of the printed pages with a reader device associated with the printing device and storing the identification information of each printed page in a field of the print job record in the database.

Assembling all of the printed pages of the print job comprises transporting each page of the print job from the printing device to an inserter system, matching the pages received by the inserter system to the print job, and collating the pages of the print job to form a completed print job.

Reading identification information stored within the electronic data storage device attached to each of the assembled printed pages comprises transporting the completed print job from the inserter system to a sorting device, passing the completed print job within a range of a quality control reader device while transporting the completed print job, and reading the identification information stored in the electronic data storage device of each page of completed print job.

Comparing the identification information of the assembled pages comprises comparing the identification information sensed by the quality control reader device for every page of the completed print job to the identification information stored in the print job record. If the identification information sensed by the quality control reader device does not include all of the identification information stored in the print job record or if the identification information sensed by the quality control reader device includes identification information that is not stored in the print job record, the completed print job is directed to a holding area. If the identification information sensed by the quality control reader device includes all of the identification information stored in the print job record and the identification information sensed by the quality control reader device does not include identification information that is not stored in the print job record, the completed print job is directed to a system output area.

Assembling all of the printed pages of the print job may comprise conveying each page of the print job from the printing device to the inserter system, reading the identification information stored in the electronic data storage device of each page received by the inserter system with a reader device associated with the inserter system, sorting each page received from the printing device, collating the pages of the print job, and securing all of the pages of the print job as a completed print job when the all pages of the print job have been received by the inserter system. The pages are sorted by comparing the identification information sensed by the inserter system reader device to the identification information stored in the print job records of the database, and associating the page with the print job record containing the identification information sensed by the inserter system reader device.

BRIEF DESCRIPTION OF THE DRAWINGS

The present disclosure may be better understood and its numerous objects and advantages will become apparent to those skilled in the art by reference to the accompanying drawings in which:

FIG. 6 is a schematic representation of a database stored in a memory section of the printer system.

DETAILED DESCRIPTION

An "electronic data storage device" 12 is a either a machine-writeable/machine-readable device or machine-readable only device capable of storing electronic data. Electronic data storage device refers to a single electronic data storage device as well as to a collection of two or more electronic data storage devices connected, for example, in series, in parallel, or nested one within another. Examples of electronic data storage devices 12 include, but are not limited to, radio frequency identification tags (RFID tags), proximity (Prox) tags, iButtons, smartcards, and similar devices. Radio frequency identification (RFID) is a method of remotely storing and retrieving data using devices called RFID tags/transponders. An RFID tag is a small object, such as an adhesive sticker, that can be attached to or incorporated into a product. RFID tags contain antennas to enable them to receive and respond to radio-frequency queries from an RFID transceiver.

The electronic data storage device 12 may be attached to a physical page 14 by an adhesive, by a removable adhesive, by a magnetic material, by an embedding procedure, by a glue, or some other mechanical attachment method known in the art. Attachment may be permanent or removable. "Attached" and "affixed" as used herein are defined as operatively connected to or in close proximity to. The electronic data storage device 12 may be "embedded" to a surface of a page 14 using a process such as Printed Organic Electronics (POE) using a reel-to-reel fabrication process to print the electronic data storage device on a writing surface.

Figure 1:
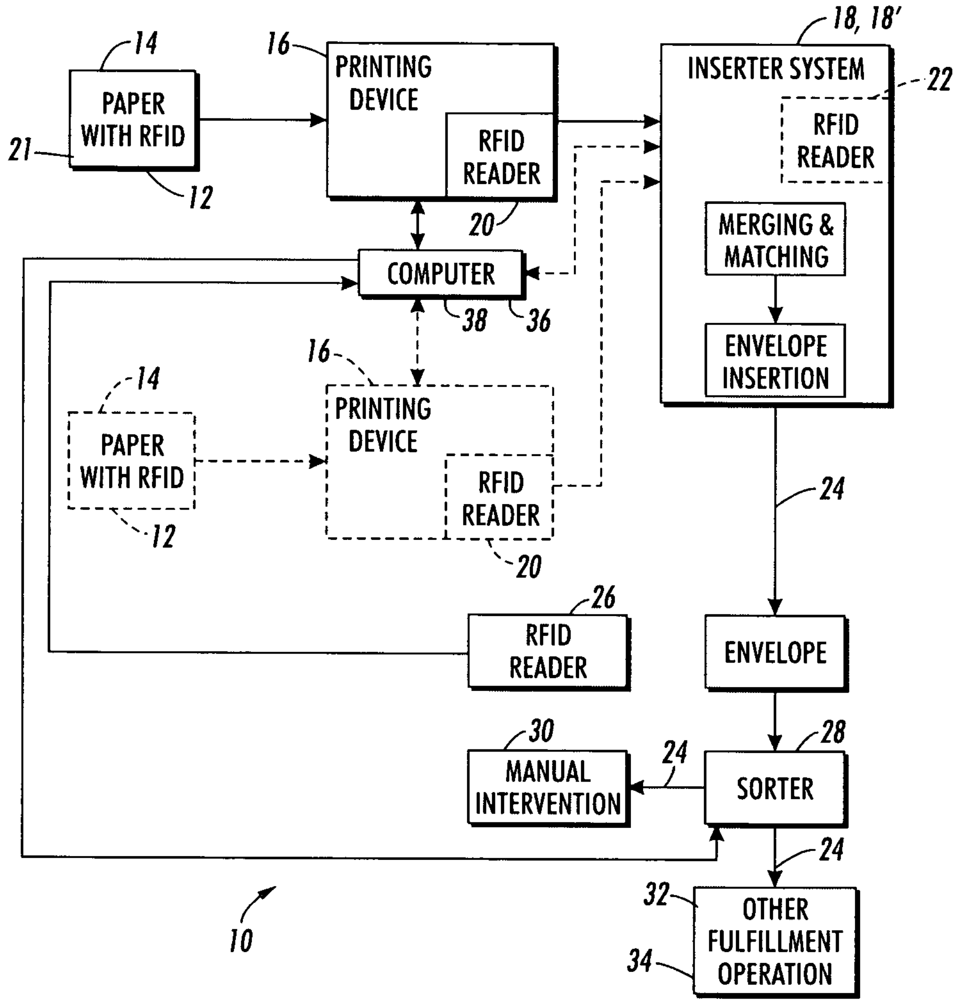
FIG. 1 is a schematic diagram of a verification system for variable printing products.

With reference to FIG. 1, a verification system 10 includes at least one printing device 16 and an inserter system 18, 18' that receives pages output from the printing device 16. Each printing device 16 in the system 10 utilizes at least one paper source loaded with paper 14 having an electronic data storage device 12, for example an RFID attached thereto. Generally, the paper 14 is supplied to the printer mechanism of the printing device 16 from at least one paper supply tray, as is known in the art. A reader device 20, for example an RFID reader, associated with the printing device 16 senses identification 21 information stored in the electronic data storage device 12 of each piece of paper 14 utilized in the printing device 16. The reader device 20 may be situated to obtain the identification information 21 at any point in the print cycle of the printing device 16, from the point where the paper is fed to the printer mechanism to the point where the printed page exits the printing device 16.

The inserter system 18, 18' performs several functions. The individual pages 14 of the print job must be matched to the print job, collected together, merged/collated to form the completed print job, and inserted into an envelope, or the like, to facilitate delivery of the print job and to ensure that all of the pages of the print job remain together. As shown in FIG. 1, the matching, collecting and merging functions may be performed to produce a completed print job, which is then inserted into the envelope. Alternatively, the pages of the print job may be matched to the print job and then inserted into the envelope, thereby combining the collecting, merging and insertion functions.

In one embodiment, the inserter system 18 includes a reader device 22 that senses the identification information 21 stored in the electronic data storage device 12 of each page 14 received by the inserter system 18. The pages 14 received by the inserter system 18 are matched to the associated print job by comparing the identification information of the page to the identification information of the pieces of paper that were used by the printing device 16 while printing the print job. The individual pages of each print job are then collected together, merged/collated to form the completed print job, and inserted into an envelope as described above.

Alternatively, a conventional inserter system 18' may be used. Such inserter systems 18' are generally used by organizations making large mailings, where the contents of each item mailed may vary. Such systems typically comprise: feeder modules for insertion of sheets into a batch, either multiply or singly; web modules for separating webs into discrete forms and inserting the discrete forms into the batch; envelope modules for inserting the batches into envelopes; a transport system for conveying sheets and forms through the various modules to form proper batches; inserter modules for inserting the batches into envelopes; and a control system to synchronize the operation of the inserter system to assure that the batches are properly assembled, inserted into envelopes, and, possibly, metered.

Information for control of such known inserter system 18' is read from a control document, which is preferably a form, by a scanner associated with the feeder module or web module which feeds that document. Preferably that module is the most upstream module along the transport system. The scanner reads information from the control document which typically includes information such as information defining the number of documents to be inserted at each module, information providing an I.D. code for comparison with I.D. codes printed on the inserted documents to assure that documents are properly matched, and, possibly, information for other purposes such as selection of postage. This control information is then transmitted to the control system which controls the operation of the inserter system 18' accordingly to assure the proper assembly and processing of each batch as defined by a control document.

After each print job is inserted into an envelope, the envelope is removed from the inserter system 18, 18' by a transport device 24, such as a conveyor. As explained in greater detail below, a quality control reader device 26 is positioned in proximity to the transport device 24, downstream of the inserter system 18, 18' in the direction of transport of the envelopes. The quality control reader device 26 senses identification information 21 stored in the electronic data storage device 12 of each page 14 of the print job to verify that the envelope contains all of the pages of the print job and does not contain any pages that are not a part of the print job.

A sorting device 28 downstream of the quality control reader device 26 directs the envelopes containing incomplete print jobs and the envelopes containing mixed print jobs to a holding area 30 where the contents of the envelope can be corrected. If the envelope contains a complete and correct print job, the sorting device 28 directs the envelope to a print system output area. For example, if other fulfillment operations must be performed on the print job, the sorting device directs the envelope to the designated work area 32. If the envelope contains a complete and correct print job, and no other fulfillment operations must be performed, the sorting device directs the envelope to a mailing facility 34 for transmittal out of the print shop.

A computer 36 is in electronic communication with the inserter system 18, 18', each printing device 16, each reader device 20, 22, 26, the sorting device 28, and possibly the transport device 24. The computer 36 includes a database 38 for storing information relating to each print job 40, including a page count 42 of the number of pages 14 comprising the print job 40 and the identification information 44 for each piece of paper 14 that is utilized in printing the print job 40. The computer 36 also contains a verification operating system 46 that interfaces with the operating systems of the printing device 16, inserter system 18, 18', sorter 28 and transport device 24 to coordinate overall operation of the verification system 10. Alternatively, the verification operating system 46 may include modules to actively control operation of the printing device 16, inserter system 18, 18', sorter 28 and transport device 24. The verification operating system embodies a method of quality control for print jobs.

Figure 2:
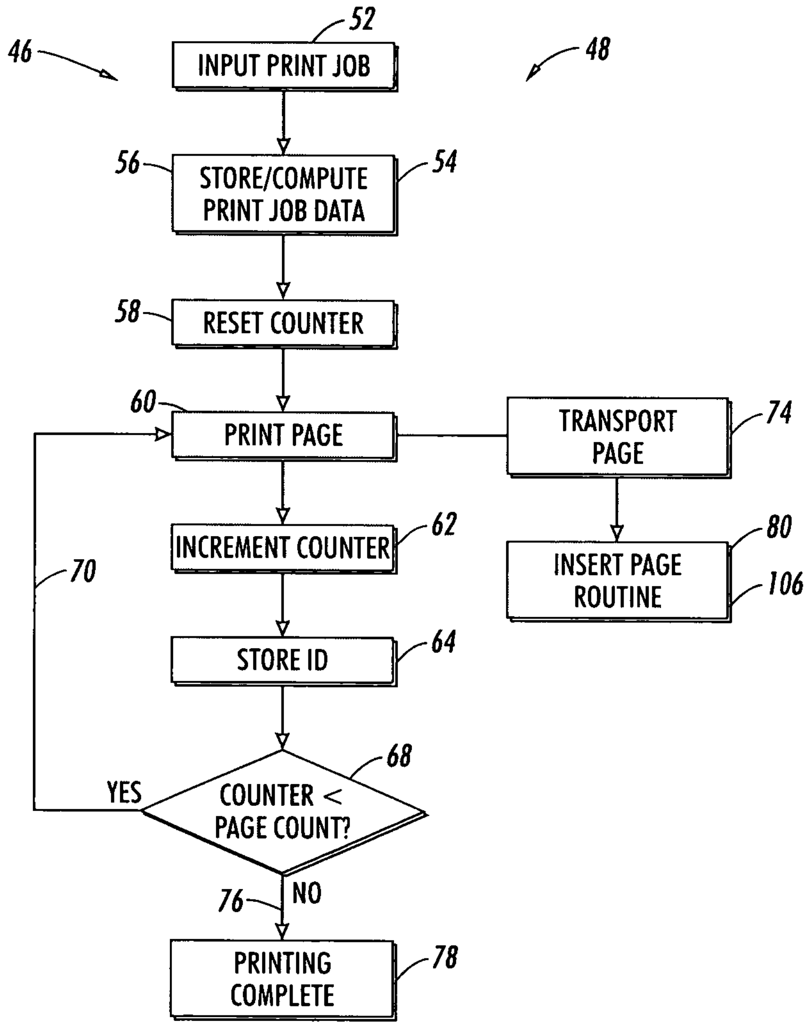
FIG. 2 is a flow diagram of the print routine of the verification operating system.

With reference to FIG. 2, the print routine 48 of the verification operating system 46 commences operation when the print job 40 is initially received 52 at the printing device 16 of the system 10, creating a record 50 in the database 38 for the print job 40. If the print job data received by the system 10 includes a count of the number of pages comprising the print job, this page count data is stored 54 in a field 55 of the print job record 50 in the database 38. If the print job data received by the system 10 does not include a count of the number of pages comprising the print job 40, the print routine 48 computes 56 the page count and stores 54 this data in the print job record 50 in the database 38. The print routine 48 then resets/sets 58 a counter associated with the print job 40 to zero and then initiates printing 60 of the first page 14 of the print job 40. As the page 14 is printed, the print routine 48 increments 62 the counter by one and stores 64 the identification information 44 of the piece of paper 14 utilized to print the page 14 in a field 66 of the print job record 50 in the database 38, thereby associating each page with the print job. The print routine 48 then queries 68 whether the count of the counter is less than the page count 42 stored in the print job record 50 in the database 38. If the count of the counter is less 70 than the page count 42 stored in the print job record 50 in the database 38, the print routine 48 loops back, initiating printing 60 of the subsequent page, incrementing 62 the counter by one, and storing 64 the identification information 44 of the piece of paper 14 utilized to print the page in a field 72 of the print job record 50 in the database 38. Each printed page is transported 74 to the inserter system 18, 18'. If the count of the counter is not less 76 than the page count stored in the print job record in the database, print job is completed printing 78 and the print routine 48 goes into standby until the next print job is received by the system 10.

Figure 3:
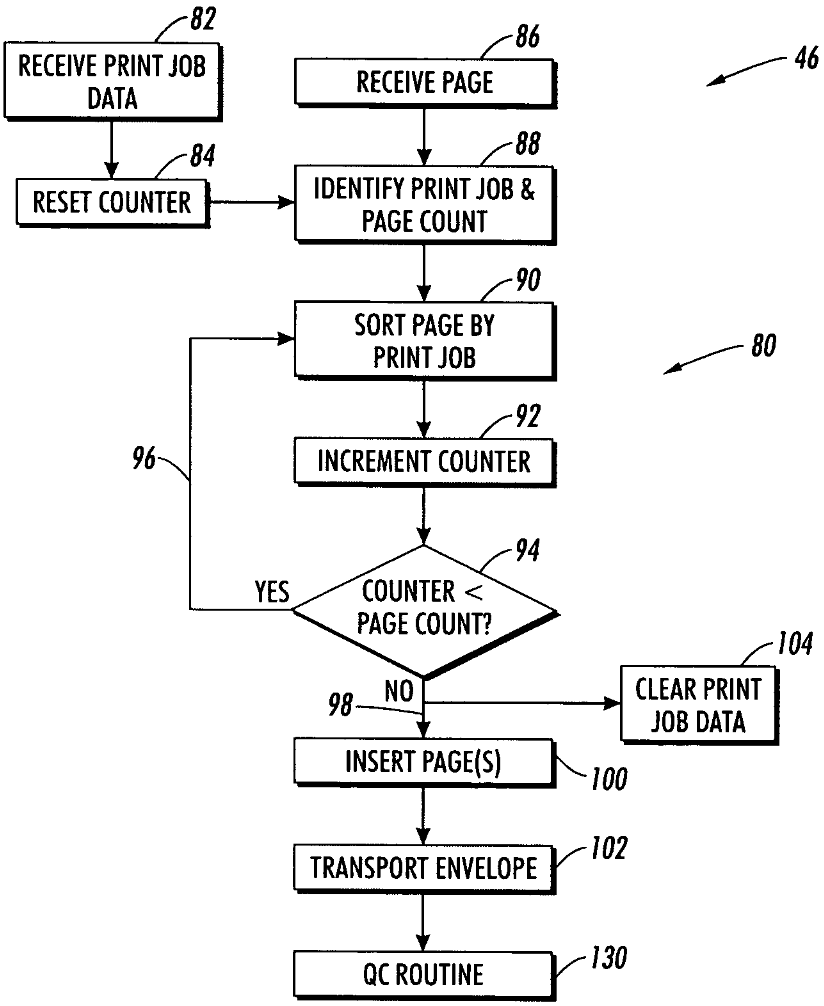
FIG. 3 is a flow diagram of a first embodiment of the inserter routine of the verification operating system.

FIG. 3 depicts a first embodiment of the insert page/inserter routine 80, for controlling a conventional inserter system 18'. If the inserter system 18' has a controller, the print job page count 42 and other print job data is transmitted 82 from the computer 36 to the inserter system controller. The inserter system controller resets/sets 84 a counter associated with the print job 40 to zero, identifies 88 the print job associated with the first page received 86 from the printing device 16 in a conventional manner, and then commences to sort 90 subsequent pages received from the printing device 16 based on the associated print jobs. As each page of a print job is collated, the inserter routine increments 92 the counter by one. The inserter routine 80 then queries 94 whether the count of the counter is less than the page count. If the count of the counter is less 96 than the page count, the inserter routine loops back, collating 90 the subsequent page and incrementing 92 the counter by one. If the count of the counter is not less 98 than the page count, the print job has been completely collated. The inserter routine 80 then inserts 100 the completed print job into an envelope, or similar container for retaining the completed print job, which is then transported 102 from the inserter system 18' to the sorting device 28 by the transport device 24. If the inserter system 18' is being controlled by an inserter system controller, the inserter routine clears 104 the print job data associated with the completed print job from the controller memory.

Figure 5:
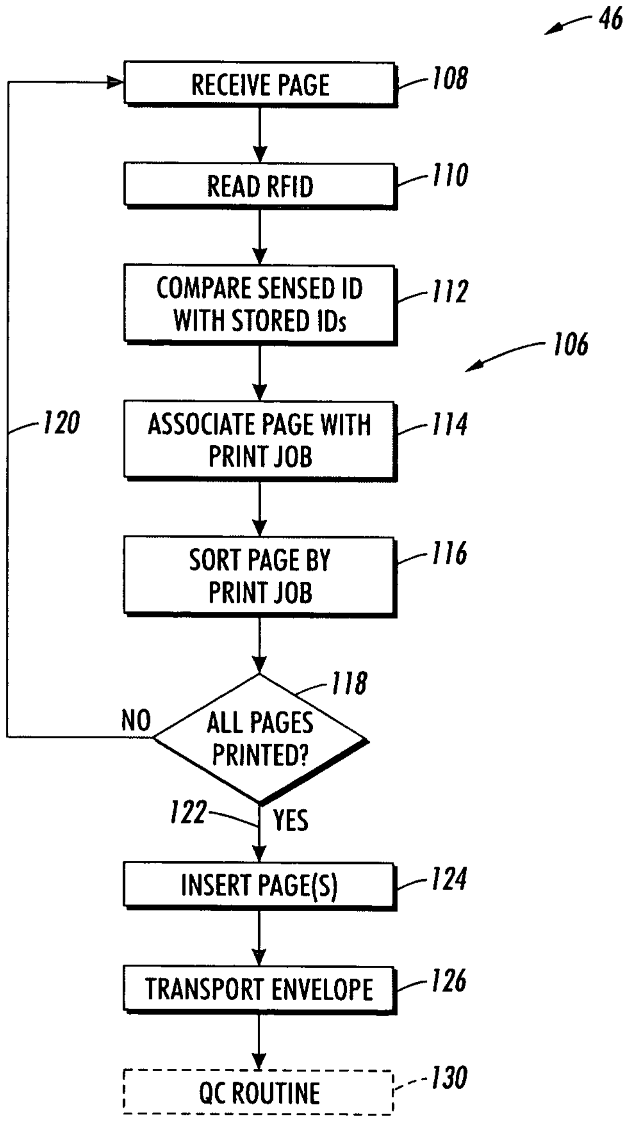
FIG. 5 is a flow diagram of a second embodiment of the inserter routine of the verification operating system.

FIG. 5 depicts a second embodiment of the insert page/inserter routine 106 used in an inserter system 18 having a reader device 22. When the printed page 14 is received 108 by the inserter system 18, the identification information 21 stored in the electronic data storage device affixed to the page is read 110 by the reader device 22. The inserter routine 106 compares 112 this sensed identification 21 information to identification information 44 stored in the computer database 38 and correlates the page 14 with the print job 40 associated 114 with the stored identification information 44. The page 14 is then collated 116 based on the identified print job 40. The inserter routine 106 then queries 118 whether all of the pages 14 associated with the print job 40 have been received at the inserter system 18. If all of the pages 14 associated with the print job 40 have not been received 120 at the inserter system, the inserter routine 106 stands-by to receive 108 a subsequent page 14 of the print job 40. If all of the pages associated with the print job have been received 122 at the inserter system 18, the completed print job is inserted 124 into an envelope and removed from the inserter system 18 and transported to the sorting device 28 by the transport device 24.

Figure 4:
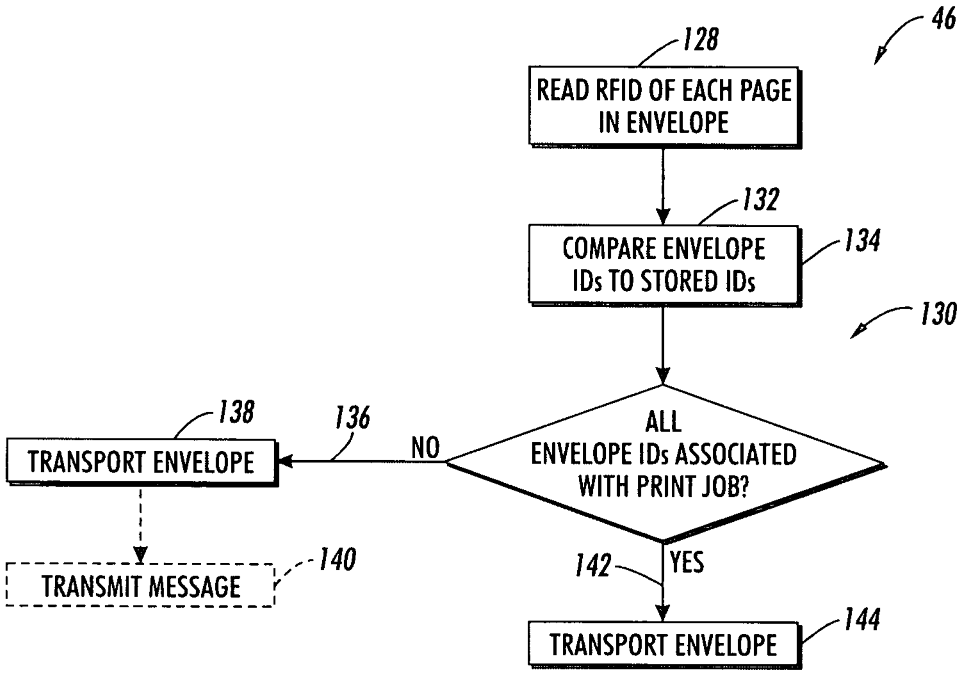
FIG. 4 is a flow diagram of the quality control routine of the verification operating system.

With reference to FIG. 4, as each envelope is transported 126, 102 from the inserter system 18, 18' to the sorting device 28, it passes within the range of the quality control reader device 26, which reads 128 the identification information 21 stored in the electronic data storage device 12 of each page 14 of print job 40 in the envelope. The quality control routine 130 then determines whether the print job in the envelope is complete and correct. To do this, the quality control routine first correlates 132 the identification information 21 for one of the pages 14 with the print job 40 associated with the stored identification information 44. Then, the quality control routine 130 compares 134 the sensed identification information 21 for every page 14 in the envelope to the print job identification information 44 stored in the record 50 for the print job 40. If the sensed identification information 21 does not include the stored identification information for each page of the print job (an incomplete print job), or if the sensed identification information includes identification information that is not included in the print job identification information stored in the computer (a mixed print job), the sorting device 28 directs 136 the transport device 24 to transport 138 the envelope to a holding area 30 where the contents of the envelope can be corrected. The quality control routine 130 may also initiate 140 a message alerting the print shop personnel or initiate a log entry regarding the improper print job. If the sensed identification information includes the stored identification information for each page of the print job, and the sensed identification information does not include identification information that is not included in the print job identification information stored in the computer, the sorting device 28 directs 142 the transport device 24 to transport 144 the envelope to either a subsequent work area 32 for additional fulfillment operations or to a mailing facility 34 for transmittal out of the print shop.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A print shop mailing verification system comprising:

at least one printing device including at least one paper source supplying paper having an electronic data storage device attached to each piece of paper, each electronic data storage device having page identification information stored therein;

a quality control reader device adapted to sense the page identification information stored in the electronic data storage devices of a completed print job;

a computer in communication with the at least one printing device and the quality control reader device, the computer including a database having:

a page count of the number of pages of each print job received by the at least one printing device, and the page identification information of each piece of paper utilized by the at least one printing device to print each print job;

an inserter system receiving pages output from the at least one printing device;

a sorting device in communication with the computer; and a transport device adapted to convey pages output by the inserter system to the sorting device;

wherein the quality control reader device is disposed proximate to the transport device.

2. The mailing verification system of claim 1 wherein the at least one printing device also includes a reader device adapted to sense the page identification information stored in the electronic data storage devices, the printing device reader device being in communication with the computer.

3. The mailing verification system of claim 1 further comprising:

a mailing facility adapted to distribute complete and correct print jobs from the print shop;

a holding area disposed intermediate the sorting device and the mailing facility, the holding area being adapted to receive output comprising incomplete or mixed print jobs from the sorting device; and a system output area disposed intermediate the sorting device and the mailing facility, the system output area being adapted to receive output comprising complete and correct print jobs from the sorting device.

4. The mailing verification system of claim 3 wherein the inserter system is in communication with the computer.

5. The mailing verification system of claim 4 wherein the inserter system includes a reader device adapted to sense the page identification information stored in the electronic data storage devices, the inserter system reader device being in communication with the computer.

6. The mailing verification system of claim 5 wherein the computer comprises a mailing verification operating system adapted to control the at least one printing device, the inserter system, the sorting device and the transport device.

7. A method of controlling the quality of print shop print jobs comprising a plurality of pages, the method comprising:

printing each page of the print job with a printing device;

creating a record in a database stored in a computer for each print job;

associating page identification information stored within an electronic data storage device attached to each printed page with the print job, associating page identification information comprising reading page identification information stored within the electronic data storage device attached to each of the printed pages with a reader device associated with the printing device, storing the page information of each printed page in a field of the print job record in the database, and storing a page count of the number of pages of the print job in a field of the print job record;

assembling all of the printed pages of the print job;

reading page identification information stored within the electronic data storage device attached to each of the assembled printed pages; and comparing the page identification information of the assembled printed pages to the page identification information of the printed pages associated with the print job to determine if the print job is complete and correct.

8. The method of claim 7 wherein assembling all of the printed pages of the print job comprises:

transporting each page of the print job from the printing device to an inserter system;

matching the pages received by the inserter system to the print job; and collating the pages of the print job to form a completed print job.

9. The method of claim 8 wherein reading page identification information stored within the electronic data storage device attached to each of the assembled printed pages comprises:

transporting the completed print job from the inserter system to a sorting device;

passing the completed print job within a range of a quality control reader device while transporting the completed print job; and reading the page identification information stored in the electronic data storage device of each page of completed print job.

10. The method of claim 9 wherein comparing the page identification information of the assembled pages comprises:

comparing the page identification information sensed by the quality control reader device for every page of the completed print job to the page identification information stored in the print job record; and directing the completed print job to a holding area of the print shop if the page identification information sensed by the quality control reader device does not include all of the page identification information stored in the print job record, or the page identification information sensed by the quality control reader device includes page identification information that is not stored in the print job record; or directing the completed print job to a system output area of the print shop if the page identification information sensed by the quality control reader device includes all of the page identification information stored in the print job record, and the page identification information sensed by the quality control reader device does not include page identification information that is not stored in the print job record.

11. The method of claim 10 wherein if the page identification information sensed by the quality control reader device does not include all of the page identification information stored in the print job record, or the page identification information sensed by the quality control reader device includes page identification information that is not stored in the print job record:

a message is sent alerting the print shop; or a log entry is initiated regarding the print job.

12. The method of claim 10 wherein assembling all of the printed pages of the print job comprises:

transmitting print job data, including print job page count data from the computer to a controller of an inserter system;

setting a counter associated with the print job to zero;

conveying each page of the print job from the printing device to the inserter system;

sorting each page received from the printing device based on the print job data received from the computer;

incrementing the counter associated with the print job by one for each page of the print job received from the printing device;

collating the pages of the print job; and securing all of the pages of the print job as a completed print job when the count of the counter equals the page count data.

13. The method of claim 10 wherein assembling all of the printed pages of the print job comprises:

conveying each page of the print job from the printing device to the inserter system;

reading the page identification information stored in the electronic data storage device of each page received by the inserter system with a reader device associated with the inserter system;

sorting each page received from the printing device by comparing the page identification information sensed by the inserter system reader device to the page identification information stored in the print job records of the database, and associating the page with the print job record containing the page identification information sensed by the inserter system reader device;

collating the pages of the print job; and securing all of the pages of the print job as a completed print job when the all pages of the print job have been received by the inserter system.

14. A verification system comprising:

at least one printing device including at least one paper source supplying paper having an electronic data storage device attached to each piece of paper, each electronic data storage device having page identification information stored therein, and a reader device adapted to sense the page identification information stored in the electronic data storage devices;

an inserter system receiving pages output from the at least one printing device and collating the pages to form completed print jobs;

a sorting device receiving completed print jobs from the inserter system;

a quality control reader device adapted to sense the page identification information stored in the electronic data storage devices, the quality control reader device being disposed intermediate the inserter system and the sorting device; and a computer in communication with the at least one printing device, the printing device reader device, the inserter system, the sorting device, and the quality control reader device, the computer comprising a database including:

a page count of the number of pages of each print job received by the at least one printing device, and the page identification information of each piece of paper utilized by the at least one printing device to print each print job.

15. A method of controlling the quality of print shop print jobs comprising a plurality of pages, the method comprising:

printing each page of the print job with a printing device;

associating page identification information stored within an electronic data storage device attached to each printed page with the print job;

storing the page identification information of each printed page in a field of the print job record in the database;

storing a page count of the number of pages of the print job in a field of the print job record in the database;

assembling all of the printed pages of the print job, forming a completed print job;

passing the completed print job within a range of a quality control reader device;

reading the page identification information stored in the electronic data storage device of each page of completed print job with a quality control reader device; and comparing the page identification information of the completed print job to the page identification information stored in the print job record to determine if the print job is complete and correct.

16. The method of claim 15 wherein comparing the page identification information of the completed print job comprises:

comparing the page identification information sensed by the quality control reader device for every page of the completed print job to the page identification information stored in the print job record; and directing the completed print job to a holding area of the print shop if the page identification information sensed by the quality control reader device does not include all of the page identification information stored in the print job record, or the page identification information sensed by the quality control reader device includes page identification information that is not stored in the print job record; or directing the completed print job to a system output area of the print shop if the page identification information sensed by the quality control reader device includes all of the page identification information stored in the print job record, and the page identification information sensed by the quality control reader device does not include page identification information that is not stored in the print job record.

17. The method of claim 16 wherein if the page identification information sensed by the quality control reader device does not include all of the page identification information stored in the print job record, or the page identification information sensed by the quality control reader device includes page identification information that is not stored in the print job record:

a message is sent alerting the print shop; or a log entry is initiated regarding the print job.

* * * * *